INVENTORS
Peter N. Renzi
Charles Hsu
BY Frank J. Gordon
ATTORNEY 3,269,542
APPARATUS FOR TREATING LIQUID WASTE
Peter N. Renzi, Mountainside, and Charles Hsu, Edison, N.J., assignors to American Radiator & Standard Sanitary Corporation, New York, N.Y., a corporation of Delaware
Filed Feb. 21, 1964, Ser. No. 346,563
4 Claims. (Cl. 210—151)

This invention relates to a method for treatment of waste and system therefore. More particularly, this invention deals with a system for the treatment of sanitary and industrial liquid waste.

The general basis for the present invention is somewhat similar to the known arrangements of treating liquid wastes with aerobic biochemical action. In the prior art methods the biological action between bacteria and liquid wastes is made to occur in one of two ways. In one method the bacterial colonies are encouraged to grow on well aerated beds of rock or other solid packing material over which the liquid waste is permitted to trickle, commonly called a trickling filter. In the other method the bacteria are allowed to propagate as free moving entities. In other words, the bacteria are not attached to any surface in large tanks containing the liquid waste, commonly termed the activated sludge system. In the latter case, the waste is usually aerated by bubbling air through the tank or agitating the liquid surface in a manner to bring fresh waste to the surface thereby insuring uniform contact with air.

An important object of the present invention is to provide a unique method and system for treatment of waste.

Another object of the present invention is to provide waste treatment system including aeration means, aerobic biochemical treatment means and settling collection means.

Yet another object of the present invention is to provide a unique system for aeration of waste liquids.

Still another object of the present invention is to provide a unique system for aerobic biochemical activity.

Other objects and advantages will become apparent from a more detailed consideration of the invention taking into consideration the drawings wherein.

Before turning to the drawings for a detailed consideration of the present invention, it should be noted that in the treatment of waste in the present invention the entering waste is mixed with recirculated waste and is passed through an aerator where oxygen is transferred to the waste. From the aerator the waste flows to a reaction tank wherein aerobic biological activity takes place which removes the polluting elements from solution and converts them to a settleable form.

Settlement of the solids is achieved in the reaction or settling tank which contains separate banks of packing which may be in the form of cores of cellular structures. The solids are continuously and gradually scoured out by the action of the liquid in passing through the cells. The scoured materials are of fairly large size due to an agglomeration effect between the smaller particles. Such larger sized solids will settle very rapidly in the spaces between the cores of cellular structures. Suitable collection provision is made at the bottom of the reaction tank whereby the solids may be either subjected to anaerobic digestion or the solids may be drawn off for either partial or complete recirculation to the inlet side of the reaction tank or to final disposal.

From the flow diagram it will be appreciated that the system utilizes two units for treatment. The first unit is an aerator 11 for suitably establishing a sufficiently high oxygen content in the liquid waste so that the aerobic bacteria can propagate in the reaction tank 12.

Figure 1:
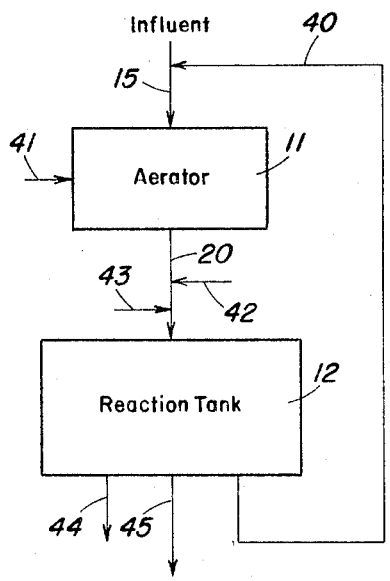
FIGURE 1 is a flow diagram of the system of the present invention.
Figure 3:
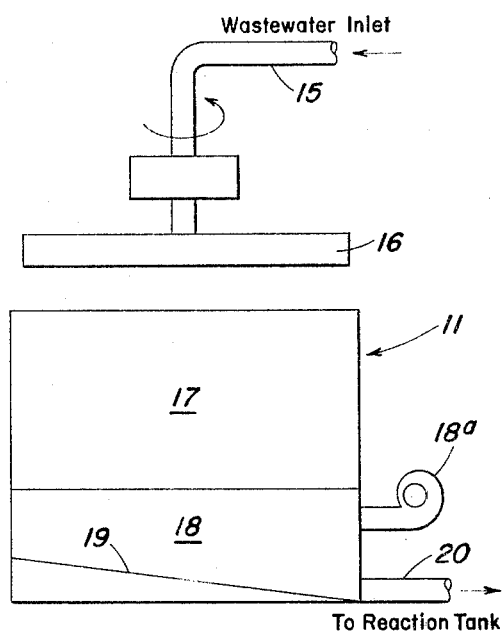
FIGURE 3 is a diagrammatic side elevatiton of the aerator utilized in the present system.

For a more detailed presentation of the aerator attention is directed to FIGURE 3. A conduit 15 carries the waste water to a distribution means shown schematically at 16. The distribution means may be rigidly mounted above the aerator 11 or may be a rotating distributor of the type commonly associated with trickling filter beds. The dissolved oxygen content in the waste water is usually low, being of the order of 0–0.5 p.p.m.

Distribution is effected over packing 17. This packing may be of the type disclosed in Renzi patent applications Serial Numbers 39, 266, now abandoned, and 255,952 and consist of superimposed layers of cellular structures. By way of example, the total height of the layers may be from six inches to three feet. The material defining the cells may be made thin so that more effective area may be made available to insure good liquid-air contact. The packing may be in the form of honeycomb structure which may be economically manufactured from specially treated paper, that is, the paper is impregnated with a resin. By way of example, a throughput value of 20–50 g.p.m. per square foot of contact area has been found suitable within the confines of the structure to provide 2–9 p.p.m. of dissolved oxygen at the discharge side of the aerator.

The waste liquid is distributed over the packing 17 by means of distributor 16. The liquid thereby distributed coats the surfaces of the packing and trickles downwardly. Air surrounds the packing and is absorbed by the large film of liquid. Means, such as the blower 18a, may be provided to pass air through the packing. At the bottom of the layers of packing the waste drops in a free fall through zone 18 onto inclined floor 19 which directs the liquid by gravity towards discharge conduit 20 which carries the now aerated liquid to the reaction tank 12.

Figure 2:
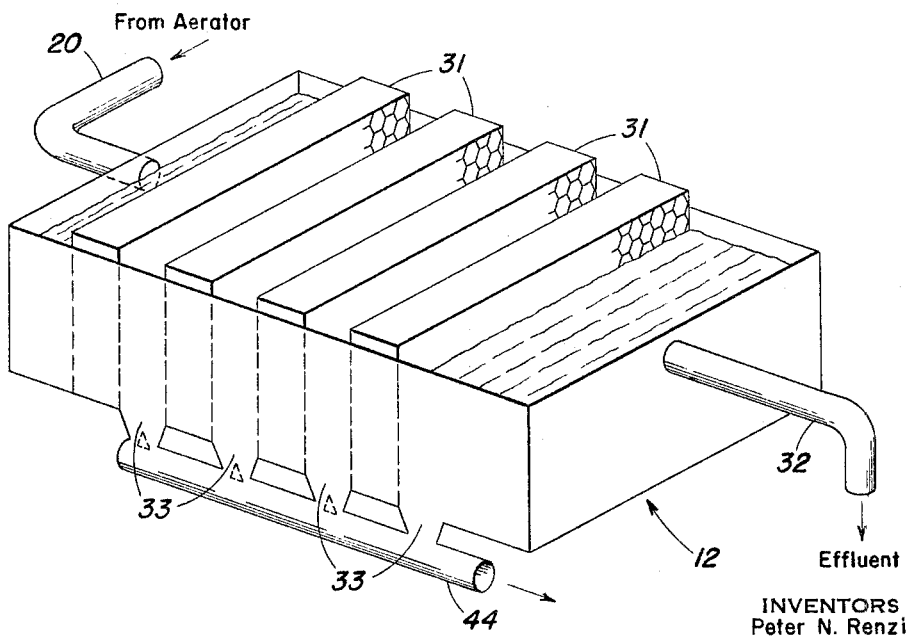
FIGURE 2 is a diagrammatic perspective view of the reaction tank in the present system.

Attention is now directed to FIGURE 2 for a more detailed view of the reaction tank 12. The tank 12 may be open at the top. Positioned in the tank are separate cores of cellular structures 31 which may be similar to the packing 17 in terms of size, material, substance, and configuration. By way of example, honeycomb cellular structures, are shown in the drawings. The honeycomb cores 31 may be positioned horizontally, or substantially horizontally in they may be inclined slightly downhill to facilitate clearance of accumulated solids as will be described. The aerated water from the aerator is distributed by means of conduit 20 to the upper portion of tank 12. The treated liquid waste is removed at the other end of tank 12 near the upper portion thereof by conduit 32. It will be appreciated that the positioning of the introduction means and discharge makes for the establishment of a high water level, thereby covering the cells of the honeycomb cores 31. The bacteria form and adhere to the cell walls of the honeycomb cores. Inasmuch as the waste liquid carries nutrients and is suitably oxygenated, aerobic growth is encouraged.

The digested and biochemically converted as well as simply flocculated materials accumulate in the bottoms of the honeycomb cells. The continuing flow of waste liquid clears the accumulated solids therefrom so that they fall from the cores into the converging hoppers 33 positioned along the bottom of the tank 12 transverse to the flow of the liquid and between the cores 31. An accumulation of the solids in the hoppers 33 acts as a fluid lock so that a thick slurry of the solids may be withdrawn for reduction of water content and final disposal.

Now that the units, that is, aerator 11 and reaction tank 12 have been given thorough consideration, attention is again directed to the flow diagram. Influent is mixed with a quantity of the treated liquid which is pumped through conduit 40. The mixture enters the aerator 11 by means of conduit 15. Liberal air supply is admitted by conduit means as at 41. The quantity of re-circulated liquid employed depends on the nature of the influent. A rather thick influent requires a greater quantity of re-circulated liquid.

The aerated liquid is then passed through conduit 20 to the reaction tank 12. Additional make up influent may be introduced at 42 in the event that the oxygen level of the liquid from the aerator warrants it.

Additionally, some sludge material may be re-introduced at 43 to provide further bacteria source material or to provide nuclei for settlement purposes.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. Apparatus for treating liquid waste comprising an aerator, a spray distributor positioned above said aerator, means for supplying liquid waste to said spray distributor, packing positioned in said aerator, means to carry the aerated liquid waste from said aerator to a settling tank, at least one cellular core in said settling tank, each said core having an entrance face and an exit face with the cells thereof in a substantially horizontal plane, the bottom portion of said settling tank adjacent the exit face of each core having means terminating in a discharge for removal of accumulation, and an effluent outlet on said settling tank arranged to receive effluent from the exit face of each said core.

2. Apparatus for treating liquid waste comprising an aerator, a spray distributor for said aerator, means supplying liquid waste to said spray distributor, packing positioned in said aerator, said packing being a cellular structure constructed of thin water-proofed paper, the walls of the cells being vertical and open at each end, a settling tank having an inlet port and a discharge port, means to carry the aerated liquid waste from said aerator to the inlet port of the settling tank, at least one cellular structured packing core located in said settling tank, each said core having an entrance face and an exit face with the cells thereof in a substantially horizontal plane, the bottom portion of said settling tank adjacent the exit face of each packing core having a hopper configuration terminating in a discharge means for removal of accumulation, the aforementioned discharge port being positioned substantially near the uppermost portion of the settling tank to receive effluent from the exit face of each said core.

3. Apparatus for treating liquid waste comprising an aerator, a spray distributor positioned above said aerator and spaced therefrom, said aerator being open at the top, means for supplying liquid waste to said spray distributor, packing positioned in said aerator, said packing having a honeycomb configuration, said honeycomb packing being constructed of thin water-proofed paper, the walls of said honeycomb being vertical and open at each end, said aerator having an inclined bottom portion for collection of aerated liquid waste, said honeycomb packing being spaced from said inclined bottom, blower means for supplying air to the bottom of said packing, a settling tank having an inlet port and a discharge port, means to carry the aerated liquid waste from the bottom portion of the aerator to the inlet port of the settling tank, and at least one honeycomb core located in said settling tank, each said core having an entrance face and an exit face, each said core being constructed of thin water-proofed paper, the bottom portion of the settling tank adjacent to exit face of each honeycomb core having a hopper configuration terminating in a discharge means for removal of accumulation, the aforementioned discharge port being positioned substantially near the uppermost portion of the settling tank to receive effluent from the exit face of each said core.

4. Apparatus for treating liquid waste comprising an aerator, a spray distributor positioned above said aerator and spaced therefrom, said aerator being open at the top, means for supplying liquid waste to said spray distributor, packing positioned in said aerator, said packing having a honeycomb configuration, said honeycomb packing being constructed of thin water-proofed paper, the walls of said honeycomb packing being vertical and open at each end, said aerator having an inclined bottom portion for collection of aerated liquid waste, said honeycomb packing being spaced from said inclined bottom, blower means for supplying air to the bottom of said packing, a settling tank having an inlet port and a discharge port, each of said ports being located near the uppermost portion of the tank, a discharge pipe adapted to carry the aerated liquid waste from the bottom portion of the aerator to the inlet port of the settling tank, at least one honeycomb core located in said settling tank, each said core having an entrance face and an exit face, each core having the cells thereof in a horizontal plane, each said honeycomb core being constructed of thin water-proofed paper, the bottom portion of the settling tank adjacent the exit face of each honeycomb core having a hopper configuration terminating in a discharge means for removal of accumulation.

References Cited by the Examiner

UNITED STATES PATENTS

| 1,477,894 | 12/1923 | Perry | 210—17 X |
| 2,146,542 | 2/1939 | Hawley | 210—13 X |
| 2,458,163 | 1/1949 | Hays | 210—9 X |
| 2,463,464 | 3/1949 | Lind | 210—150 |
| 3,112,261 | 11/1963 | Porter et al. | 210—17 |

FOREIGN PATENTS

| 994,118 | 8/1951 | France. |
| 219,536 | 7/1924 | Great Britain. |
| 799,826 | 8/1958 | Great Britain. |

MORRIS O. WOLK, *Primary Examiner.*

M. E. ROGERS, *Assistant Examiner.*